United States Patent
Rumbley, Jr.

(10) Patent No.: US 11,577,115 B1
(45) Date of Patent: Feb. 14, 2023

(54) BARBELL WEIGHT PLATE SECURING STRAP

(71) Applicant: Billy Chuck Rumbley, Jr., Tuscumbia, AL (US)

(72) Inventor: Billy Chuck Rumbley, Jr., Tuscumbia, AL (US)

( * ) Notice: Subject to any disclaimer, the term of this patent is extended or adjusted under 35 U.S.C. 154(b) by 79 days.

(21) Appl. No.: 17/172,187

(22) Filed: Feb. 10, 2021

Related U.S. Application Data

(63) Continuation-in-part of application No. 16/023,173, filed on Jun. 29, 2018, now Pat. No. 11,000,724.

(51) Int. Cl.
*A63B 21/072* (2006.01)
*F16B 2/08* (2006.01)

(52) U.S. Cl.
CPC ............ *A63B 21/0728* (2013.01); *F16B 2/08* (2013.01); *A63B 2209/00* (2013.01); *A63B 2225/09* (2013.01)

(58) Field of Classification Search
CPC ........ A63B 21/072–08; A63B 2209/09; A63B 2225/09; A63B 2244/09; F16B 2/08; A61F 9/027; A61F 2013/00489; A61F 13/64; A61F 5/0123; A61F 5/0125; A61F 5/0106; A61F 5/0109; A61F 5/02; A61F 5/022; A61F 5/024; A61F 5/026; A61F 5/028; Y10T 24/1498; Y10T 24/1406; B65D 75/02; B65D 63/1018; B65D 63/1027
See application file for complete search history.

(56) References Cited

U.S. PATENT DOCUMENTS

| | | | | |
|---|---|---|---|---|
| 84,082 | A * | 11/1868 | Boylson | A41F 9/002 2/339 |
| 441,693 | A * | 12/1890 | McElroy | B65D 63/1018 24/DIG. 16 |
| 535,502 | A * | 3/1895 | Knighton | B65D 63/10 24/17 A |
| 3,059,359 | A * | 10/1962 | Goldammer | G09F 3/005 40/633 |
| 3,169,004 | A * | 2/1965 | Rapata | F16B 2/08 248/74.5 |
| 4,874,151 | A * | 10/1989 | Fritz | G05G 5/06 24/306 |
| 9,662,530 | B2 * | 5/2017 | Dimitrov | A63B 21/0728 |

(Continued)

*Primary Examiner* — Garrett K Atkinson
*Assistant Examiner* — Kathleen M Fisk
(74) *Attorney, Agent, or Firm* — Lanier Ford Shaver & Payne, PC; Gerald M. Walsh

(57) ABSTRACT

A weight plate securing strap having a stretchable strip with a first end, a second opposite end, a first side, a post on the first end, and a plurality of apertures near the second opposite end. A first gripping flap is positioned at the first end and a second gripping flap is positioned at the second opposite end. The gripping flaps are also positioned on the first side. The gripping flaps are constructed so that fingers and thumbs of a user remain on the first side of the strip as the user grips the gripping flaps, stretches the strip around the barbell, and inserts the post into the aperture. The use of the gripping flaps thereby prevents the fingers and thumbs of the user from interfering with the insertion of the post through the aperture. The strip wound and stretched around the barbell creates high resistance to movement of the strip along the length of the barbell. The strip can be made in one piece and entirely of rubber.

7 Claims, 3 Drawing Sheets

(56) References Cited

U.S. PATENT DOCUMENTS

| | | | | |
|---|---|---|---|---|
| 10,039,949 B2 * | 8/2018 | Brasch | ............... | A63B 21/0728 |
| 10,107,317 B1 * | 10/2018 | Brasch | ............... | A63B 21/0783 |
| 11,000,724 B1 * | 5/2021 | Rumbley, Jr. | ...... | A63B 21/0726 |
| 2002/0060275 A1 * | 5/2002 | Polad | ...................... | F16L 3/137 |
| | | | | 248/74.3 |
| 2010/0043266 A1 * | 2/2010 | Pedicano | ......... | G06K 19/07762 |
| | | | | 40/633 |

\* cited by examiner

BARBELL WEIGHT PLATE SECURING STRAP

CROSS-REFERENCE TO RELATED APPLICATIONS

This application claims priority to U.S. Provisional Patent Application No. 62/526,594 filed on Jun. 29, 2017 and to U.S. Non-Provisional patent application Ser. No. 16/023,173 filed on Jun. 29, 2018, the contents of which are incorporated herein by reference in their entirety.

FIELD OF THE INVENTION

The present invention relates generally to the field of weight training devices such as barbells and dumbbells that use removable weight plates secured with collars and, more particularly, to barbell weight plate securing straps.

BACKGROUND

Weightlifting is a past time that often requires barbells to perform certain exercises. A barbell is equipment used in weightlifting that comprises a long bar or shaft that is typically metal. Heavy adjustable, removeable weight plates having central apertures therein are positioned over each end of the barbell. Once attached, a weightlifter can perform exercises by, for example, lifting the barbell in any number of different exercises.

There are various ways of securing the weight plates to the barbell. There are quicklee collars that are approximately 3-inch-long metal or plastic tubes that have a slightly narrower tube therein. With a quicklee collar, the weightlifter pulls an outer layer of the tube away from an inner layer and slides the collar on to the end of the barbell.

There are also spin-lock collars that comprise two layers coupled via one or more screws. To secure weights on a barbell using a spin-lock collar, the weightlifter unscrews the two layers so that the collar is loose enough to slide on the end of the barbell.

Clamp collars are pressurized spring coils that secure weights to the barbell. In this regard, a piece of metal is coiled four or five times before branching into two padded prongs. To insert the clamp collar over the end of the barbell to secure the weights, the weightlifter squeezes the prongs on the clamp to loosen the coiled metal, slides the clamp onto an end of the barbell, then releases the prongs, thereby securing the clamp to the barbell. Other collars that may be used include screw-on collars and pressure collars.

Prior art products are heavy and may add a significant amount of weight to the barbell assembly. Current products lack durability and are often made of many small parts that can be lost or broken. Many current products use two or more inches of sleeve length in order to fasten the collar securely, making the entire apparatus bulky. Furthermore, current inventions do not accommodate all sizes of barbell sleeves equally due to the limited range of their clamping force.

SUMMARY OF THE INVENTION

The present invention provides weight plate securing strap having a stretchable strip with a first end, a second opposite end, a first side, and a second opposite side. A post is positioned on the first end and a plurality of apertures are positioned near the second opposite end. A first gripping flap is positioned at the first end and a second gripping flap is positioned at the second opposite end. The first and second gripping flaps are also positioned on the first side. The first and second gripping flaps are constructed to facilitate stretching the strip and inserting the post into one of the plurality of apertures to attach the strip to a barbell. The gripping flaps are constructed so that fingers and thumbs of a user remain on the first side of the strip as the user grips the gripping flaps, stretches the strip around the barbell, and inserts the post into the aperture. The strip is made preferably of rubber and when wound and stretched around the barbell the strip creates a high resistance to movement of the strip along the length of the barbell.

The present invention also provides method of securing a weight plate to a barbell. The first gripping flap and the second gripping flap are gripped with the thumb and fingers. The first end of the strip is placed adjacent to the weight plate on the barbell, between the weight plate and an end of the barbell. The second opposite end of the strip is wound around the circumference of the barbell so that the second opposite end engages the post on the first end. The strip is stretched until a desired aperture reaches the post. The post is inserted into the aperture to form a circular collar to secure the weight plate to the barbell so that the weight plate does not fall off the end of the barbell. The fingers and thumbs remain on the first side of the strip as the strip is stretched around the barbell and as the post is inserted into the aperture.

There are several advantages to the weight plate securing strap of this invention. The gripping flaps extend from the first side of the strip so that the fingers and thumbs of a user do not get in the way of the ends of the strip as they are being drawn towards each other and as they overlap. The use of the gripping flaps also prevents the fingers and thumbs of the user from interfering with the insertion of the post through the aperture. The strip can be made in one piece and entirely of rubber which has excellent frictional properties. The strap is easy and inexpensive to manufacture. It is easy and quick to install and remove. It adds negligible weight to the barbell and does not damage the barbell. The strap can prevent weight plates at least up to 100 pounds from falling off the end of barbell.

BRIEF DESCRIPTION OF THE DRAWINGS

The disclosure can be better understood referencing the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

This invention relates to a weight plate securing strap that fixedly and removably couples weight plates to a barbell. The strap comprises a flexible, stretchable strip that wraps around the barbell and is adjacent the weight plates that have been placed on the barbell. As an example, the strip may be comprised of stretchable and flexible material, preferably plastic, rubber, or rubber-containing materials. On a first end of the stretchable strip is a post and on a second opposite end is a series of apertures that go through the flexible strip. In use, a user (weightlifter, for example) holds the ends of the strap on one side of the strap, wraps the strap around the barbell adjacent the weight plate, and inserts the post into one of the apertures. The particular aperture through which the user inserts the post depends upon the diameter of the barbell. Once the strap is in place the weight plate cannot come off the end of the bar bell.

Figure 1:
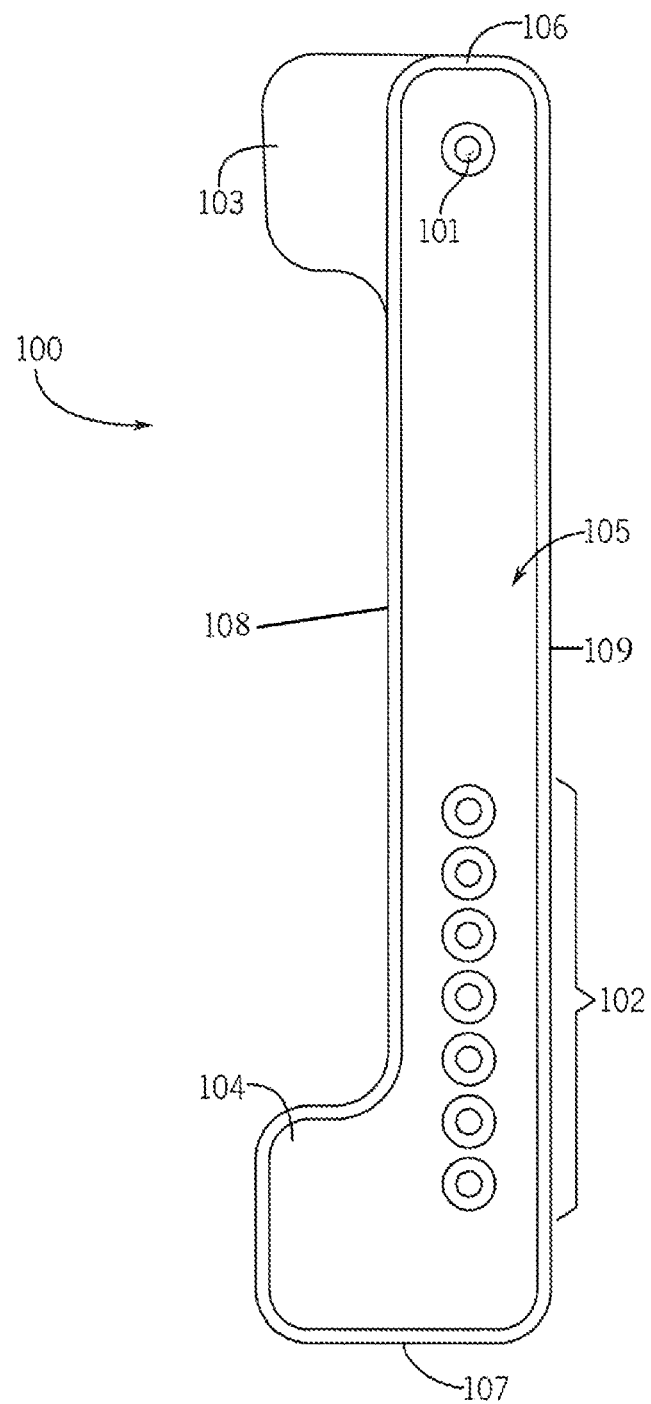
FIG. 1 shows a top plan view of an exemplary weight plate securing strap in accordance with an embodiment of the present invention.

FIG. 1 shows a top plan view of an exemplary weight plate securing strap 100 in accordance with an embodiment of the present invention. The weight plate securing strap 100 has a stretchable strip 105 that is made of any suitable type of stretchable material, preferably rubber containing material. Rubber is preferred because it has excellent frictional properties. Also, the entire strap as shown in FIG. 1 can be made entirely of rubber, which makes manufacturing the strap 100 easy and relatively inexpensive. The strip has a first end 106, a second opposite end 107, a first side 108, and a second opposite side 109. A gripping flap 103 is positioned at the first end 106 and a gripping flap 104 is positioned at the second opposite end 107. The gripping flaps 103 and 104 are also positioned on the first side 108 of the strip 105. The gripping flaps 103 and 104 are constructed for a user to grip the strip 105 at the ends 106 and 107 to facilitate stretching and installing the strap 100 to a barbell 200 adjacent to a weight plate 201 on the barbell 200 (see FIG. 2). The strip 105 has a post 101 on the first end 106 and a plurality of apertures 102 which are located near the second opposite end 107. The post 101 is made of a strong material which can be metal or plastic. The post 101 is sized and configured, preferably, for tight insertion through the apertures 102.

The gripping flaps 103 and 104 extend from one side 108 of the strip 105 and, preferably, are approximately perpendicular to the first side 108 of the strip 105. The gripping flaps 103 and 104 are constructed so that a user can grip the gripping flaps 103 and 104 with the thumb and one or more fingers of the user's hands. The user can then stretch the strip 105 from the first side 108 of the strip 105 with the gripping flaps 103 and 104.

Figure 2:
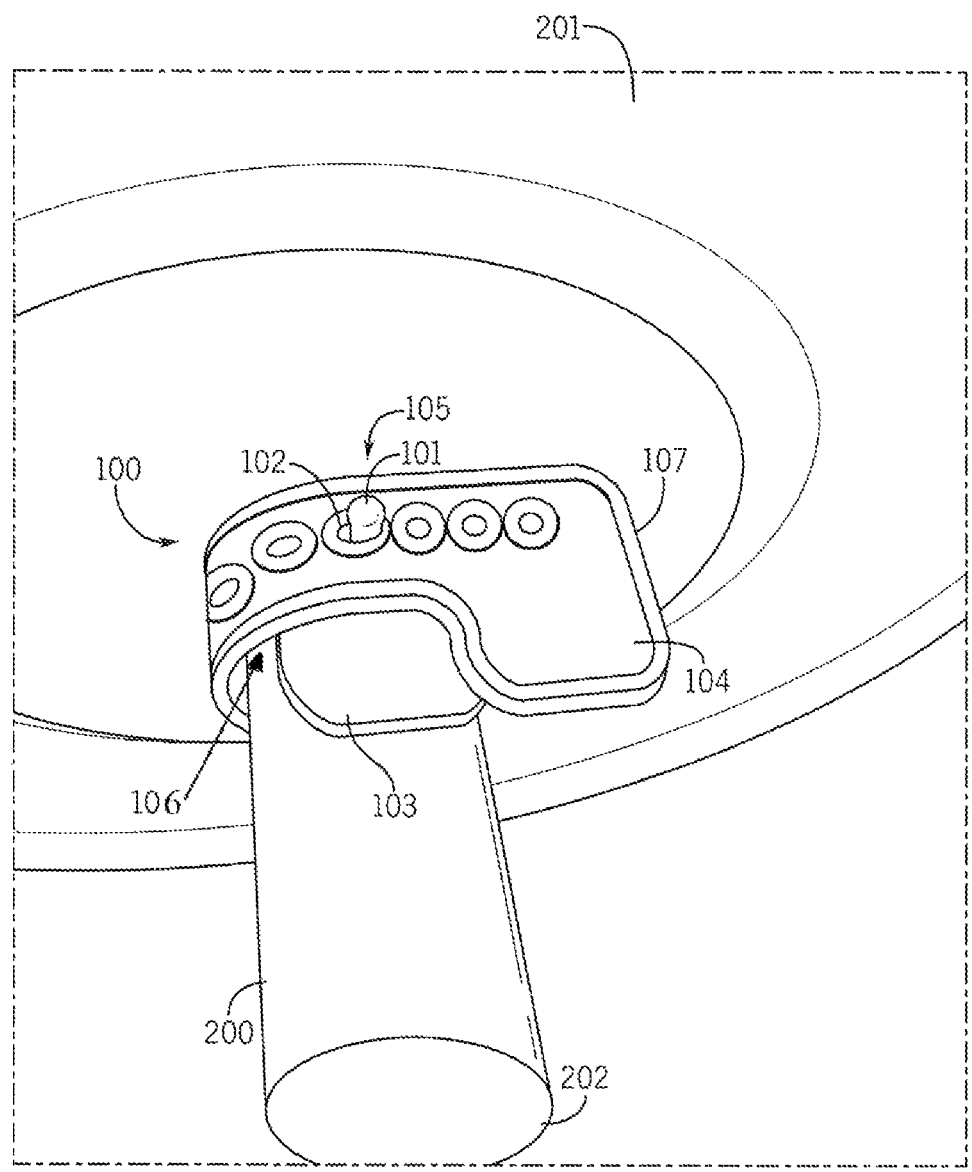
FIG. 2 shows a top, side perspective view of the flexible weight plate securing strap of FIG. 1 installed near an end of a barbell and securing a weight on the barbell.

FIG. 2 shows a top, side perspective view of the flexible weight plate securing strap 100 installed near an end 202 (see FIG. 3) of a barbell 200 and securing a weight plate 201 on the barbell 200. In use, a user grasps the gripping flaps 103 and 104 and places the first end 106 with the post 101 adjacent to a weight plate 201 on the barbell 200 between the weight plate 201 and the end 202 of the barbell 200. The user stretches the strip 105 and wraps the second opposite end 107 of the strip 105 around the circumference of the barbell 200 so that the second opposite end 107 is drawn towards the first end 106 and the second opposite end 107 overlaps the first opposite end 106. The user then inserts the post 101 through the aperture 102 such that the strap 100 remains in place and snugly grasps the barbell 200.

The gripping flaps 103 and 104 extend from the first side 108 of the strip 105 so that the fingers and thumbs of the user do not get in the way of the ends 106 and 107 as they are being drawn towards each other and as they overlap. The use of the gripping flaps 103 and 104 also prevents the fingers and thumbs of the user from interfering with the insertion of the post 101 through the aperture 102. The gripping flaps 103 and 104 are constructed so that the fingers and thumbs of the user remain on the first side 108 of the strip 105 as the user grips the flaps 103 and 104, stretches the strip 105 around the barbell 200, and inserts the post 101 through the aperture 102.

Figure 3:
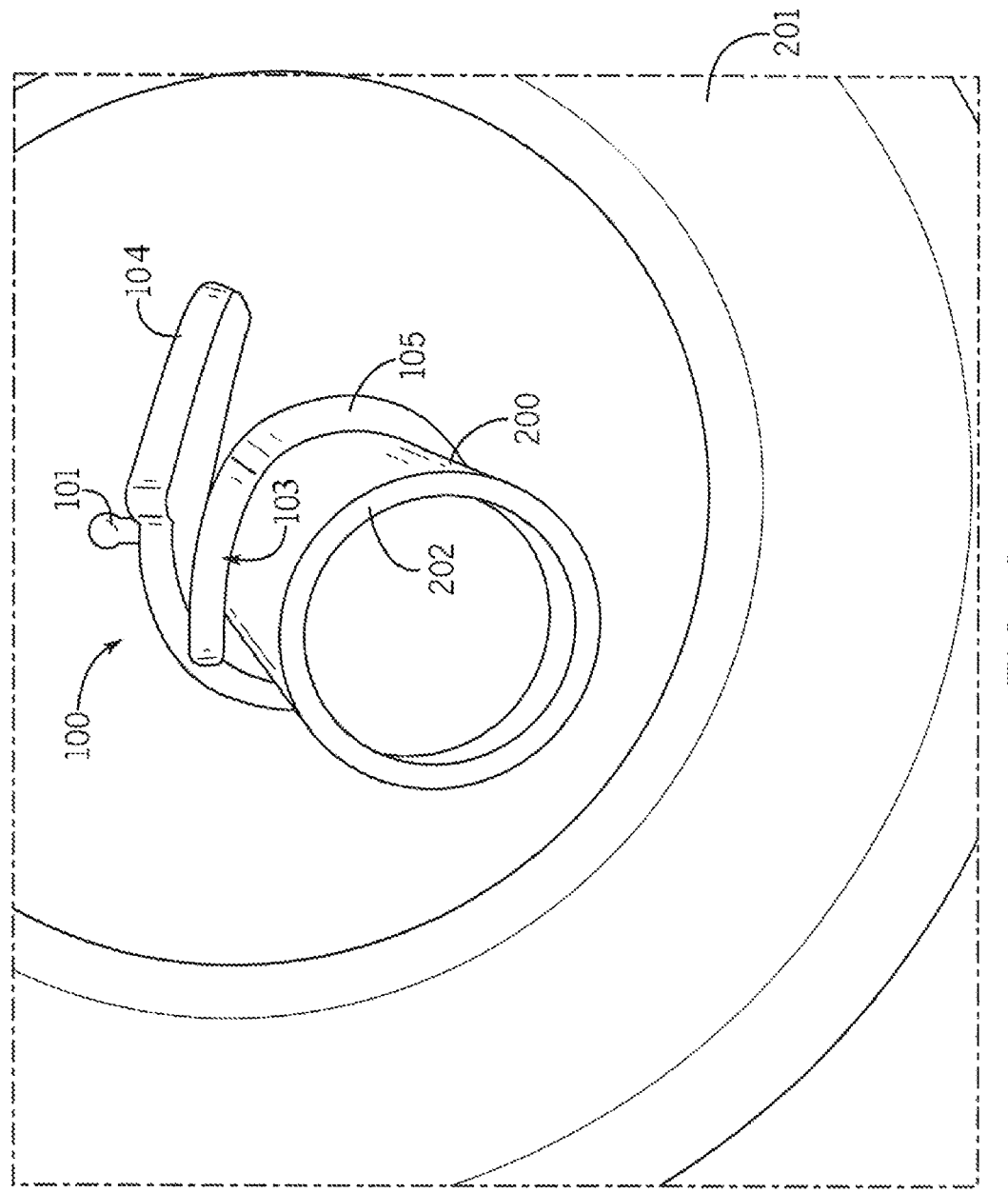
FIG. 3 shows a bottom, side perspective view of the weight plate securing strap of FIG. 1 installed about an end of a barbell and securing a weight plate on the barbell.

FIG. 3 shows a bottom, side perspective view of the weight plate securing strap 100 installed near an end 202 of a barbell 200 and securing a weight plate 201 on the barbell 200. Notably, the end 106 that comprises the post 101 is placed adjacent the weight plate 201 on the barbell 200, between the weight plate 201 and the end 202 of the barbell 200. The flexible, stretchable strip 105 is wrapped around the circumference of the barbell 200 and stretched until a desired aperture 102 reaches the post 101. The post 101 is inserted through the aperture 102, thereby securing the weight plate 201 to the barbell 200 so that the weight plate 201 does not fall off the end 202 of the barbell 200.

Because of the nature of the surface of the strip 105 and its being wound and stretched around the barbell, the surface of the strip 105 creates a high resistance to movement of the strip along the length of the barbell. This feature makes of the strip 105 very effective in keeping the weight plate in place on the barbell. When the strip 105 is wound around the barbell 200 so that the post 101 at the first end 106 can be inserted into one of the apertures 102 at the second opposite end 107, the strap 100 forms a circular collar for a weight plate on a barbell.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the weight plate securing strap can be constructed in any desirable length, width, and thickness to accommodate a barbell. Rubber-like materials can be soft plastics that are processed to be like rubber. The flaps for gripping can be in any desired shape. The term "barbell" also includes the term "dumbbell".

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A weight plate securing strap, comprising:
    a) a stretchable strip having a first end, a second opposite end, a first side, and a second opposite side;
    b) a post on the first end and a plurality of apertures near the second opposite end; and
    c) a first gripping flap positioned at the first end and a second gripping flap positioned at the second opposite end, wherein the first and second gripping flaps are also positioned on the first side and wherein the first and second gripping flaps are constructed to enable stretching of the strip to facilitate inserting the post into one of the plurality of apertures to attach the strip to a barbell, such that the strip is wound and stretched around the barbell to create high resistance to movement of the strip along the length of the barbell to secure one or more weight plates to the barbell.

2. A weight plate securing strap of claim 1, wherein the gripping flaps are constructed so that fingers and thumbs of a user remain on the first side of the strip as the user grips the gripping flaps, stretches the strip around the barbell, and inserts the post into the one of the plurality of apertures.

3. A weight plate securing strap of claim 1, wherein the strip is made in one piece and of rubber.

4. A weight plate securing strap, comprising:
   a) a stretchable strip having a first end, a second opposite end, a first side, and a second opposite side;
   b) a post on the first end and a plurality of apertures near the second opposite end; and
   c) a first gripping flap positioned at the first end and a second gripping flap positioned at the second opposite end,
   wherein the first and second gripping flaps are also positioned on the first side,
   wherein the first and second gripping flaps are constructed to enable stretching of the strip to facilitate inserting the post into one of the plurality of apertures to attach the strip to a barbell,
   wherein the gripping flaps are constructed so that fingers and thumbs of a user remain on the first side of the strip as the user grips the gripping flaps, stretches the strip around the barbell, and inserts the post into the one of the plurality of apertures,
   wherein the strip is made in one piece and of rubber, and
   wherein the strip wound and stretched around the barbell creates high resistance to movement of the strip along the length of the barbell to secure one or more weight plates to the barbell.

5. A method of securing a weight plate to a barbell, comprising:
   1) providing a stretchable strip having a first end, a second opposite end, a first side, and a second opposite side; a post on the first end and a plurality of apertures near the second opposite end; and a first gripping flap positioned at the first end and a second gripping flap positioned at the second opposite end, wherein the first and second gripping flaps are also positioned on the first side;
   2) gripping the first gripping flap and the second gripping flap with the thumb and fingers;
   3) placing the first end of the strip adjacent to the weight plate on the barbell, between the weight plate and an end of the barbell;
   4) wrapping the second opposite end of the strip around the circumference of the barbell so that the second opposite end engages the post on the first end;
   5) stretching the strip until a desired aperture of the plurality of apertures reaches the post; and
   6) inserting the post into the desired aperture to form a circular collar to secure the weight plate to the barbell so that the weight plate does not fall off the end of the barbell, wherein the strip wound and stretched around the barbell creates high resistance to movement of the strip along the length of the barbell.

6. The method of claim 5, wherein the fingers and thumbs remain on the first side of the strip as the strip is stretched around the barbell and as the post is inserted into the aperture.

7. The method of claim 6, wherein the strip is made in one piece and of rubber.

* * * * *